(12) United States Patent
Zhang et al.

(10) Patent No.: US 10,367,779 B2
(45) Date of Patent: Jul. 30, 2019

(54) METHOD AND CLIENT TERMINAL FOR PROMPTING INSTANT COMMUNICATION MESSAGE

(71) Applicant: Alibaba Group Holding Limited, Grand Cayman (KY)

(72) Inventors: Lili Zhang, Hangzhou (CN); Qi Dong, Hangzhou (CN); Hang Chen, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 277 days.

(21) Appl. No.: 15/182,502

(22) Filed: Jun. 14, 2016

(65) Prior Publication Data

US 2016/0366092 A1    Dec. 15, 2016

(30) Foreign Application Priority Data

Jun. 15, 2015    (CN) .......................... 2015 1 0329146

(51) Int. Cl.
  *G06F 15/16*    (2006.01)
  *H04L 12/58*    (2006.01)
  (Continued)

(52) U.S. Cl.
  CPC .............. *H04L 51/36* (2013.01); *G06F 21/62* (2013.01); *G06F 21/6245* (2013.01); *H04L 51/04* (2013.01); *H04L 51/24* (2013.01); *H04L 63/0428* (2013.01); *H04W 4/12* (2013.01); *H04W 12/02* (2013.01); *H04W 12/08* (2013.01)

(58) Field of Classification Search
  USPC .......................... 709/206, 202, 203, 204, 205
  See application file for complete search history.

(56) References Cited

U.S. PATENT DOCUMENTS

2003/0028597 A1*  2/2003  Salmi .................. G06F 21/6245
                                                         709/204
2005/0268237 A1   12/2005  Crane et al.
(Continued)

FOREIGN PATENT DOCUMENTS

CN    101115020 A    1/2008
CN    101184264 A    5/2008
(Continued)

OTHER PUBLICATIONS

PCT Search Report and Written Opinion dated Sep. 7, 2016 for PCT Application No. PCT/US16/37431, 10 Pages.
(Continued)

*Primary Examiner* — Lan Dai T Truong
(74) *Attorney, Agent, or Firm* — Lee & Hayes, P.C.

(57) ABSTRACT

A method for prompting an instant communication message is disclosed. The method includes receiving an instant communication message; determining a message type according to the instant communication message; and invoking a corresponding way of prompting according to the message type, where at least a first way of prompting and a second way of prompting are set up in advance, and the first way of prompting and the second way of prompting are different from each other. The disclosed method is capable of providing prompts for instant communication messages of different types differently.

20 Claims, 7 Drawing Sheets

(51) Int. Cl.
*G06F 21/62* (2013.01)
*H04W 4/12* (2009.01)
*H04W 12/08* (2009.01)
*H04L 29/06* (2006.01)
*H04W 12/02* (2009.01)

(56) References Cited

U.S. PATENT DOCUMENTS

| | | |
|---|---|---|
| 2005/0272408 A1 | 12/2005 | Wilkes-Gibbs et al. |
| 2006/0167993 A1 | 7/2006 | Aaron et al. |
| 2007/0124132 A1 | 5/2007 | Takeuchi |
| 2007/0239866 A1 | 10/2007 | Cox et al. |
| 2007/0259685 A1 | 11/2007 | Engblom et al. |
| 2008/0045200 A1 | 2/2008 | Skinner et al. |
| 2008/0046510 A1 | 2/2008 | Beauchamp et al. |
| 2008/0267117 A1* | 10/2008 | Stern ............... H04L 65/4084 370/329 |
| 2008/0315884 A1* | 12/2008 | Bittar ............... G01V 3/24 324/366 |
| 2009/0144655 A1 | 6/2009 | Hardy et al. |
| 2009/0210497 A1 | 8/2009 | Callanan et al. |
| 2009/0315885 A1* | 12/2009 | Baszucki ............ G06T 13/20 345/420 |
| 2010/0315439 A1 | 12/2010 | Huang et al. |
| 2013/0097254 A1 | 4/2013 | Appelman et al. |
| 2013/0326213 A1 | 12/2013 | Murphy et al. |
| 2015/0040033 A1* | 2/2015 | Kurtz ............... G06Q 10/107 715/752 |
| 2016/0285791 A1* | 9/2016 | Teng ............... H04L 51/04 |
| 2016/0295402 A1* | 10/2016 | Chen ............... H04L 51/04 |
| 2016/0360386 A1* | 12/2016 | Widebrant ......... H04L 51/38 |
| 2017/0078235 A1* | 3/2017 | Cannata ........... G06Q 10/107 |

FOREIGN PATENT DOCUMENTS

| | | |
|---|---|---|
| CN | 102314568 A | 1/2012 |
| CN | 102546472 A | 7/2012 |
| CN | 103399700 A | 11/2013 |
| CN | 103581401 A | 2/2014 |
| CN | 103685763 A | 3/2014 |
| CN | 104066060 A | 9/2014 |
| CN | 104423856 A | 3/2015 |
| CN | 104424340 A | 3/2015 |
| CN | 104506711 A | 4/2015 |

OTHER PUBLICATIONS

Translation of Chinese Office Action dated Oct. 31, 2017, from Chinese Patent Application No. 2015103880188, 13 pages.
Translation of Chinese Office Action dated Mar. 5, 2019, from Chinese Patent Application No. 2015103880188, 4 pages.
Translation of Chinese Search Report dated Jul. 25, 2018, from Chinese Patent Application No. 2015103880188, 13 pages.
Translation of Chinese Search Report dated Oct. 23, 2017, from Chinese Patent Application No. 2015103880188, 2 pages.
Translation of Chinese Search Report dated Jul. 16, 2018, from Chinese Patent Application No. 2015103880188, 2 pages.

* cited by examiner

METHOD AND CLIENT TERMINAL FOR PROMPTING INSTANT COMMUNICATION MESSAGE

CROSS REFERENCE TO RELATED PATENT APPLICATION

This application claims foreign priority to Chinese Patent Application No. 201510329146.5 filed on Jun. 15, 2015, entitled "Method and Client Terminal for Prompting Instant Communication Message", which is hereby incorporated by reference in its entirety.

TECHNICAL FIELD

The present disclosure relates to the field of instant communications, and in particular, to methods and client terminals for prompting messages.

BACKGROUND

Instant Messaging (IM) technology realizes online real-time communications, and has become increasingly popular in applications of entertainment, chats and electronic commerce. The instant messaging technology usually implements online real-time interaction between users through client terminals. A user may send a message to a client terminal of another user through a client terminal thereof, and may further read messages sent from other client terminals through his/her client terminal.

Existing instant messaging software sends a prompt to a user when receiving messages from other users. For example, an instant messaging client terminal may include a session list 110 and a session list icon 112 as shown FIG. 1. When the session list icon 112 is clicked, the session list 110 may be displayed. The session list 110 includes session items 114, and a session window may be opened for reading and sending instant communication messages after one of the session items 114 is clicked. However, existing methods for sending reminding messages cannot satisfy personalized or differentiated needs of users.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of exemplary embodiments of the present disclosure is to provide an instant communication message prompting method and a client terminal that are capable of prompting instant communication messages of different message types in different manners.

In order to solve the above technical problem, the present disclosure provides a method for prompting an instant communication message, which may include receiving an instant communication message; determining a message type according to the instant communication message; and invoking a corresponding way of prompting according to the message type, where at least a first way of prompting and a second way of prompting are set up in advance, and the first way of prompting and the second way of prompting are different from each other.

The present disclosure further provides a client terminal, which may include a receiving module to receive an instant communication message; a type determination module to determine a message type according to the instant communication message; and a prompting module to invoke a corresponding way of prompting according to the message type, where at least a first way of prompting and a second way of prompting are set up in advance, and the first way of prompting and the second way of prompting are different from each other.

By the above example method and client terminal of prompting an instant communication message, different ways of prompting are defined for different message types in advance, such that a user is able to distinguish respective message types of currently received instant communication messages for different ways of prompting. Thus, a user can distinguish reading occasions according to his/her degree of concern for messages of different types. For example, a user may choose to read an instant communication message that is received in a more private environment upon determining that the received message is a special message according to a prompt, thereby avoiding a leakage of private information.

BRIEF DESCRIPTION OF THE DRAWINGS

To illustrate technical solutions in exemplary embodiments of the present disclosure or existing technologies more clearly, accompanying drawings needed for describing the embodiments or the existing technologies are briefly described herein. Apparently, the accompanying drawings represent merely a few embodiments disclosed in the present disclosure, and one of ordinary skill in the art may derive other drawings from these accompanying drawings without paying any creative effort.

DETAILED DESCRIPTION

Figure 1:
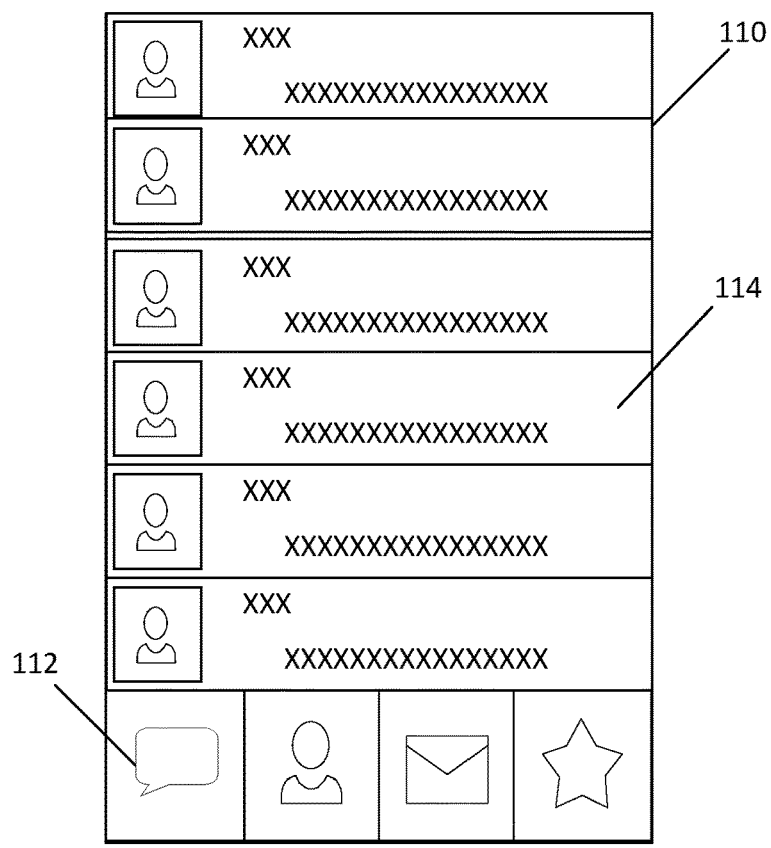
FIG. 1 is a schematic diagram of an interface image of a client terminal in existing technologies.
Figure 2:
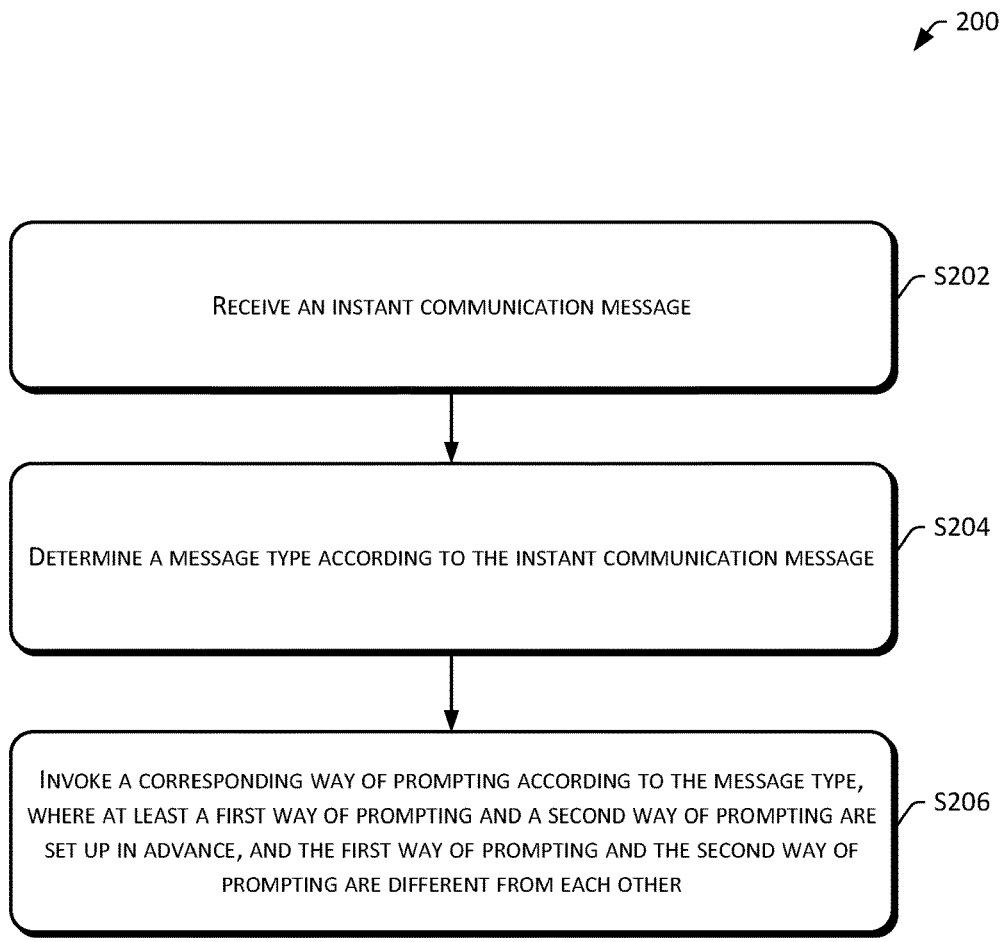
FIG. 2 is a flowchart of a method of prompting an instant communication message according to an embodiment of the present disclosure.

In order to enable one skilled in the art to have a better understanding of the technical solutions in the present disclosure, the technical solutions in the embodiments of the present disclosure are described clearly and completely herein with reference to the accompanying drawings in the embodiments of the present disclosure. Apparently, the described embodiments merely represent a portion of, and not all of, the embodiments of the present disclosure. Based on the embodiments of the present disclosure, all other embodiments derived by one of ordinary skill in the art without any creative effort shall fall within the scope of protection of the present disclosure.

FIG. 2 shows a method 200 of prompting an instant communication message according to an embodiment of the present disclosure, which may include the following method blocks.

S202 receives an instant communication message.

In implementations, instant communications may be performed between client terminals for sending and receiving instant communication messages. In implementations, a client terminal may include a communication device having a network communication function, such as a desktop computer, a notebook computer, a tablet computer, a smart phone, a smart wearable device, etc. In implementations, a client terminal may include software running in any of the above communication devices, such as instant messaging software called "Dingtalk".

In implementations, a receipt of an instant communication message by a client terminal may indicate that another client terminal has sent the instant communication message to the instant client terminal. In this way, another user is able to communicate with a current user through instant communications.

S204 determines a message type according to the instant communication message.

In implementations, the instant communication message may include a text message, a voice message and/or a video message. In implementations, the instant communication message may additionally or alternatively include a normal message and a special message. A normal message may include a text message, a voice message and/or a video message as usual, and a user may repeatedly consume/view the message after viewing for the first time. A special message may include a text message, a voice message and/or a video message therein. After being consumed/viewed by a user for the first time, the special message may be automatically destroyed, for example, physically deleted from both a client terminal and a server terminal.

In implementations, a client terminal may determine a message type based on content of the instant communication message. By way of example, if the content of the instant communication message is composed of text, a type of the instant communication message may be a text message. If the content of the instant communication message is a voice signal, the type of the instant communication message may be a voice message. Likewise, a determination may be made as to whether the type of the instant communication message is a video message. In implementations, the instant communication message may further be attached with message type information, and the message type information is used to indicate the type of the current message. By way of example, the message type information may include a character string that is configured in accordance with predetermined rule(s), and different values of the character string indicate different message types. For example, "text" indicates a text message, "voice" indicates a voice message, and "video" indicates a video message. Furthermore, "normal" indicates a normal message, "special" indicates a special message, etc. In implementations, a way of attaching the message type information to instant communication message may include the message type information being a part of the content of the instant communication message, the message type information being attribute information of the instant communication message, or the message type information being an attachment of the instant communication message.

Apparently, the type of the instant communication message and the manner of determining the type of the instant communication message are both not limited to the foregoing description. One skilled in the art may also make other modifications, inspired by the technical essence of the present disclosure, which should be covered by the scope of protection of the present disclosure, if functions and effects thereof that are achieved are the same as or similar to those of the present disclosure.

S206 invokes a corresponding way of prompting according to the message type, where at least a first way of prompting and a second way of prompting are set up in advance, and the first way of prompting and the second way of prompting are different from each other.

In implementations, a way of prompting may include change(s) in content, color and/or position, etc., of an image, or change(s) in content, color and/or position, etc., of a text, or an addition of text to an image, or a prompting sound, or a vibration reminder of a communication device, etc.

In implementations, different ways of prompting may be set up for corresponding message types. As such, upon receiving a prompt of an instant communication message, a user may know a type of the received instant communication message. In implementations, each message type may correspond to one way of prompting, or multiple message types correspond to one way of prompting. By way of example, a text message, a voice message, and a video message may correspond to individual ways of prompting respectively. For example, a corresponding prompting sound of each manner may be different from each other. Alternatively, a corresponding prompting image or prompting text of each manner may be different from each other. Additionally, a normal message may correspond to a way of prompting whereas a special message correspond to another way of prompting. At this time, a text message, a voice message and a video message belonging to a normal message may adopt the same way of prompting. A text message, a voice message and a video message belonging to a special message may adopt the same way of prompting. Apparently, the text message, the voice message and the video message belonging to the normal message may also correspond to different ways of prompting, and the text message, the voice message and the video message belonging to the special message may also correspond to different ways of prompting.

In implementations, different ways of prompting are defined for different message types in advance, such that a user is able to distinguish respective message types of currently received instant communication messages for different ways of prompting. Thus, a user can distinguish reading occasions according to his/her degree of concern for messages of different types. For example, a user may choose to read an instant communication message that is received in a more private environment upon determining that the received message is a special message according to a prompt, thereby avoiding a leakage of private information.

In implementations, the message type may include a normal message and a special message, where the normal message may be displayed repeatedly and content of the special message is deleted after the special message is displayed for a predetermined number of times or after a predetermined time interval since the time when the special message is first displayed.

In implementations, instant communication messages may be divided into normal messages and special messages, such that a user who sends messages may select a message type when sending an instant communication message according to actual needs, thus fulfilling the diversified needs of the user. For example, a user may want to send some important information, such as an account number, a password, etc., and desire the information to be destroyed after being read by the other party, so as to avoid any losses caused by unintended leakage. At this time, the user may send a special message. As a special message possesses a mechanism of automatic deletion, content of an associated instant communication message is destroyed after being displayed, to implement "Burning after Reading", which effectively prevents illegal distribution of important information, and effectively ensures information security.

In implementations, the predetermined number of times for which the special message may be displayed may be a number that is defined in advance. Display situations of a special message may be counted, and content of the special message is deleted when the number of times of displaying the special message reaches the predetermined number of times. Additionally or alternatively, content of a special message may be deleted after a predetermined time interval since the special message is displayed for the first time. Such implementation can define a life cycle for the special message, and timing starts after the special message is displayed for the first time. When a predetermined time that is defined is reached, the life cycle of the special message is considered to be ended and the content of the instant communication message is then deleted.

In implementations, a normal message may correspond to the first way of prompting, and a special message may correspond to the second way of prompting. In implementations, the first way of prompting may include setting a first prompting indicator at a first predetermined position of an interface image, and the second way of prompting may include setting a second prompting indicator at a second predetermined position of the interface image. The second prompting indicator is different from the first prompting indicator.

In implementations, the first way of prompting and the second way of prompting may both prompt a user through an image that a new instant communication message is received, and the first way of prompting and the second way of prompting are different from each other to enable a normal message to be distinguished from a special message.

In implementations, by setting a prompting indicator on an interface image, a user is prompted that a new instant communication message is received, which is more intuitive, and can bring a certain degree of privacy to the user, i.e., the user is aware of the message only when viewing via the client terminal. In some occasions, the user may not wish that the prompt of receiving an instant communication message affects others, or may not want to let others know when a new instant communication message is received. If an approach involving vibration or sound is adopted, these requirements are not met to some extent. The image way of prompting can be adopted to better meet the above requirements. The user may choose to view the instant communication message at an appropriate time, without being noticed by other people. Especially for a special message, the information security can be guaranteed for the user.

In implementations, the first way of prompting and the second way of prompting may display different prompting indicators in the interface image, thereby effectively performing a distinction therebetween and hence a distinction between types of messages that are received. For example, a first prompting indicator of the first way of prompting may be a number that can indicate the number of normal messages, and portions surrounding the number in the first prompting indicator may be red in color. A second prompting indicator of the second way of prompting may be a number that can indicate the number of special messages, and portions surrounding the number in the second indicator may be set to be black in color. Additionally or alternatively, the first prompting indicator and the second prompting indicator may be different in overall shape. For example, an overall shape of the first prompting indicator forms a circle, and an overall shape of the second prompting indicator is a triangle. Apparently, the first prompting indicator and the second prompting indicator are not limited to the examples listed above, and one skilled in the art may also make other alterations, as inspired by the technical essence of the present disclosure, which should be covered by the scope of protection of the present disclosure if functions and effects thereof that are achieved are the same as or similar to those of the present disclosure.

In implementations, the prompting indicator can be displayed at any position of the interface image. In implementations, the first way of prompting and the second way of prompting both add respectively prompting indicators on the basis of a session list icon, so as to indicate a receipt of an instant communication message in a more intuitive way. In other words, the first prompting indicator and the second prompting indicator may both be indicators that are added on the basis of the session list icon. Further, a first predetermined position and a second predetermined position are different from each other, i.e., positions of the first prompting indicator and the second prompting indicator are different on the session list icon, such that the first way of prompting and the second way of prompting can be distinguished more prominently, thereby facilitating a user to determine a type of a received message.

Figure 3:
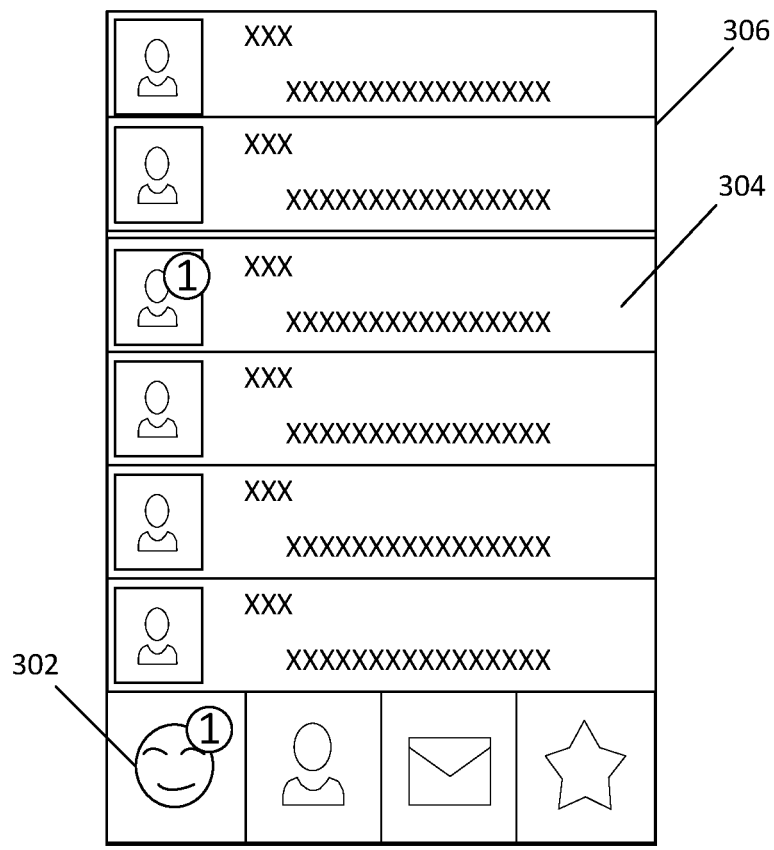
FIG. 3 is a schematic diagram of an interface image of a client terminal according to an embodiment of the present disclosure.
Figure 4:
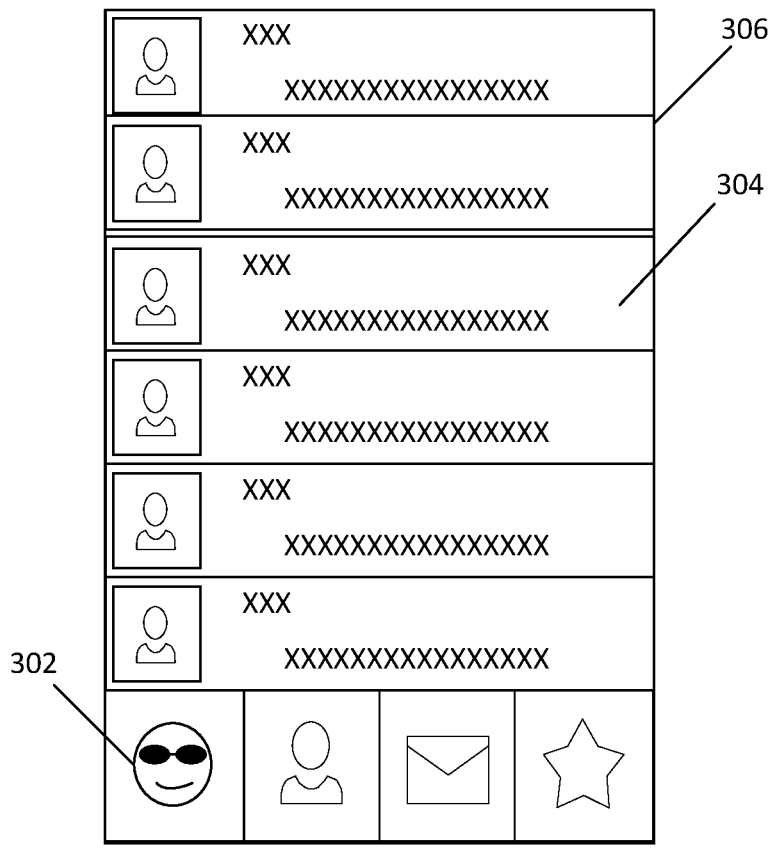
FIG. 4 is a schematic diagram of an interface image of a client terminal according to an embodiment of the present disclosure.

With reference to FIG. 3, a session list icon 302 of the client terminal may be a "smiling face" according to an embodiment. When the client terminal receives a normal message, a number "1" may be additionally displayed on the session list icon 302, and this addition of the number "1" on the session list icon 302 indicates to the user that a new normal message is received. Furthermore, the user may also be prompted via the session item 304 corresponding to the instant communication message in a session list 306, and content of the instant communication message can be viewed by clicking the session item to open a session window at this time. With reference to FIG. 4, when the client terminal receives a special message, a "sunglasses" may be added on the "smiling face" of the session list icon 302, so as to indicate to the user that a special message is received, and a number can be further added on the session list icon 302 to indicate the number of special messages that are received. In implementations, the session list icon is set as a "smiling face", and when a special message is received, "sunglasses" may be added to the "smiling face", so as to prompt the user that the message needs to be read in a more private environment. Furthermore, when the "sunglasses" is added, an animation of wearing the sunglasses may also be added. Moreover, "sunglasses" may be added when a first special message is received, and a reminder may further be added when new special message(s) is/are received. For example, a number may be additionally displayed to prompt the number of special messages.

Figure 5:
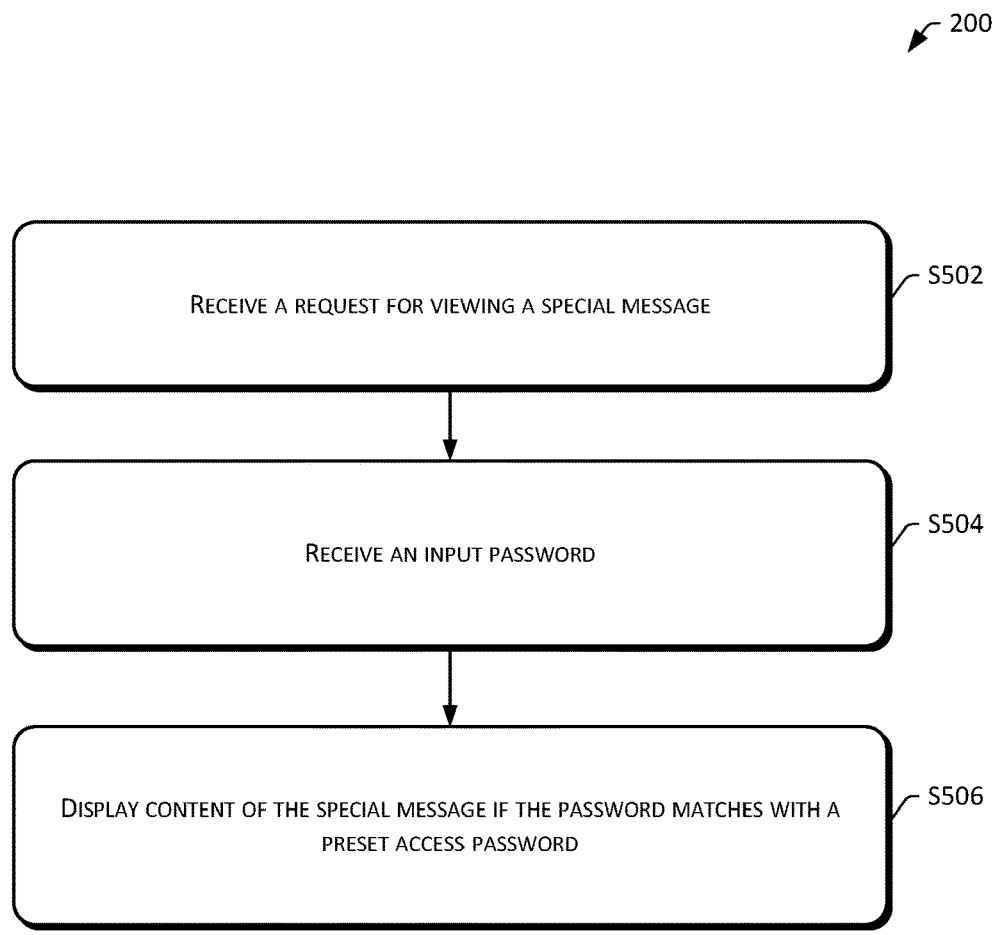
FIG. 5 is a flowchart of a method of prompting an instant communication message according to an embodiment of the present disclosure.

With reference to FIG. 5, in implementations, the message prompting method 200 may further include the following method blocks.

S502 receives a request for viewing a special message.

In implementations, the request for viewing a special message may be performed in response to detecting that a predefined event happens. The predefined event may include a button being triggered or an occurrence of a click event on an image. Additionally or alternatively, the request for viewing a special message may be performed in response to detecting that consecutive changes of motion direction in an opposite direction occur, i.e., detecting that a user shakes the client terminal.

S504 receives an input password.

S506 displays content of the special message if the password matches with a preset access password.

In implementations, a password input interface may be provided to monitor an input of the user on the interface as a password.

In implementations, an access password is set in advance, and content of the special message is displayed only when the input password and the preset password are the same, thus securely ensuring the privacy of the special message.

In implementations, the message prompting method 100 may further include: only performing a prompt according to the second way of prompting after a special message is received, and not displaying the special message in a session list.

In implementations, as the summary of content of a message is usually displayed in a session list, some information of the message may be revealed. If a special message is also displayed in the session list, partial content of the special message may be revealed, causing a failure of fulfilling the requirements of the user for the privacy of the special message. In implementations, special messages are not displayed in the session list, such that content of the special messages are difficult to be leaked out in the session list interface, thus providing a better privacy for the special messages.

In implementations, the session list does not display special messages. A session item of a special message may be set as hidden, so that the special message is not displayed on the interface. Additionally or alternatively, the session item of the special message may not be loaded so that the special message is not displayed.

In implementations, since the second way of prompting may indicate to a user that a special message is received through a change in an image only, a user who sends the special message is not exposed, thus enhancing the privacy of the special message. Furthermore, the session list does not display special messages, and therefore it is difficult for others to know a source of a special message through the client terminal of the user even if the special message is received in a relatively public area, thereby avoiding the embarrassment that the user may be forced to display the special message to the others.

Figure 6:
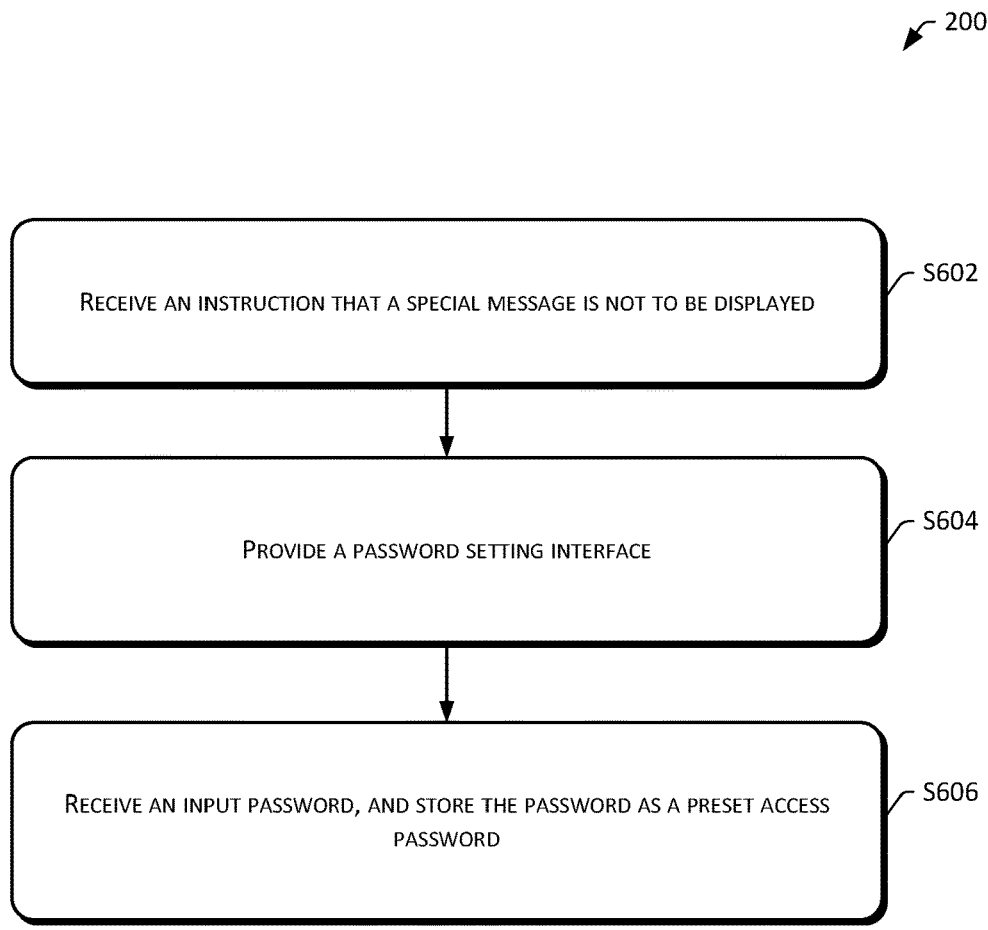
FIG. 6 is a flowchart of a method of prompting an instant communication message according to an embodiment of the present disclosure.

With reference to FIG. 6, in implementations, the instant communication message prompting method 200 may further include the following method blocks.

S602 receives an instruction that a special message is not to be displayed.

In implementations, a setup interface may be provided to allow an input of an instruction of not displaying a special message. In implementations, a detection of a clicking or triggering event of a predetermined button, image or other page element may be considered as an input of an instruction of not displaying a special message. Apparently, a detection of an event associated with a change in position, shape or other attributes of a predetermined button, image or other page element may be considered as an input of an instruction of not displaying a special message.

S604 provides a password setting interface.

S606 receives an input password, and stores the password as a preset access password.

In implementations, the password setting interface may include an input box. The input box may receive and display a password that is inputted. Furthermore, the password setting interface may further include a virtual keyboard for password input for some touchscreen devices, and an input is completed in response to detecting that buttons of the virtual keyboard are clicked.

In implementations, upon receiving the instruction of not displaying the special message, this indicates that the session list may not display a session item of the special message. Generally, content of an instant communication message is displayed when an associated session item is clicked, so that the session item can be used as an entry for viewing the instant communication message. If a session item of a special message is not displayed, this indicates that other more private approaches are used to serve as an entry for viewing the special message. In order to avoid displaying the special message due to an erroneous operation, a preset access password is set up for viewing the special message. Furthermore, presetting an access password may also effectively prevent others from performing activities including peeping or stealing the special message.

In implementations, S502 may include the session list icon being in a clicked state for a predetermined duration of time.

In implementations, a detection of a click on a session list icon that lasts for a predetermined duration of time may be treated as a request for viewing a special message. This approach may be used to serve as an entry for viewing a special message. As compared to displaying a session item in a session list, a session list icon does not reveal information about a special message, thus ensuring the privacy of the special message.

In implementations, the predetermined duration of time may be a preset time length, which may be 2-5 seconds. Apparently, the predetermined duration of time may also be set as other time lengths.

In implementations, receiving the request for viewing the special message at S502 may include successive changes of a motion direction of a mobile device implementing the method in opposite directions is detected.

In implementations, the mobile device may include a tablet computer, a mobile phone or a smart wearable device, or software running in any of the above hardware. A gyroscope may be set in the client terminal to detect a change in a motion direction. By detecting successive changes of the motion direction in opposite directions, a determination is made that the client terminal is shaken by a user. Thereby, the user may request viewing the special message by shaking the client terminal.

Furthermore, by combining the present embodiment with previous embodiments, a special message may be indicated to a user only through the second way of prompting, and successive changes of a motion direction of a client terminal in opposite directions, i.e., shaking a mobile phone by a user, may further be treated to serve as a request for viewing the special message. As such, the privacy of viewing the special message is guaranteed quite perfectly. Furthermore, as the special message has a property of automatically deleting the message content, the possibility that the special message is viewed by others can be avoided to a large extent.

Figure 7:
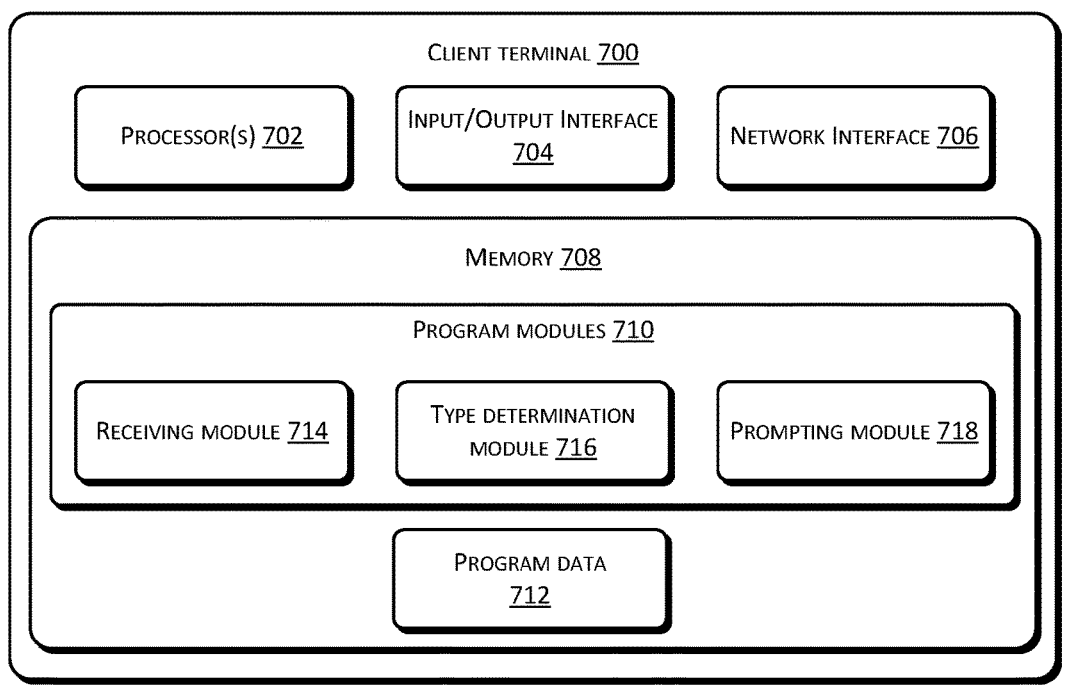
FIG. 7 is a schematic diagram of a client terminal according to an embodiment of the present disclosure.

With reference to FIG. 7, the embodiments of the present disclosure may further provide a client terminal 700. In implementations, the client terminal 700 may include one or more computing devices. By way of example and not limitation, the client terminal 700 may include one or more processors 702, an input/output interface 704, a network interface 706 and memory 708.

The memory 708 may include a form of computer-readable media, e.g., a non-permanent storage device, random-access memory (RAM) and/or a nonvolatile internal storage, such as read-only memory (ROM) or flash RAM. The memory 708 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 708 may include program modules 710 and program data 712. The program modules 710 may include a receiving module 714, a type determination module 716, and a prompting module 718.

In this embodiment, the client terminal 700 may include a communication device with a network communication function, such as a desktop computer, a notebook computer, a tablet computer, a smart phone, a smart wearable device, etc. Apparently, the client terminal 700 may include software running in any of the aforementioned communication devices, such as instant messaging software called "Dingtalk".

In implementations, the receiving module 714 may receive an instant communication message.

In implementations, a receipt of an instant communication message by the client terminal 700 may indicate that another client terminal has sent the instant communication message to the current client terminal 700. In this way, another user is able to communicate with a current user through instant communications.

In implementations, the receiving module 714 may be a communication port capable of connecting to a network, which is able to implement network communications in accordance with a network communication protocol such as HTTP or FTP, and follow corresponding standards of wired communications and wireless communications accordingly. Apparently, the receiving module 714 may also include a software component for driving a communication port.

In implementations, the type determination module 716 may determine a message type according to the instant communication message.

In implementations, the instant communication message may include a text message, a voice message and/or a video message. In implementations, the instant communication message may additionally or alternatively include a normal message and a special message. A normal message may include a text message, a voice message and/or a video message as usual, and a user may repeatedly consume/view the message after viewing for the first time. A special message may include a text message, a voice message and/or a video message therein. After being consumed/viewed by a user for the first time, the special message may be automatically destroyed, for example, physically deleted from both the client terminal 700 and a server terminal.

In implementations, the type determination module 716 may determine a message type based on content of the instant communication message. By way of example, if the content of the instant communication message is composed of text, a type of the instant communication message may be a text message. If the content of the instant communication message is a voice signal, the type of the instant communication message may be a voice message. Likewise, a determination may be made as to whether the type of the instant communication message is a video message. In implementations, the instant communication message may further be attached with message type information, and the message type information is used to indicate the type of the current message. By way of example, the message type information may include a character string that is configured in accordance with predetermined rule(s), and different values of the character string indicate different message types. For example, "text" indicates a text message, "voice" indicates a voice message, and "video" indicates a video message. Furthermore, "normal" indicates a normal message, "special" indicates a special message, etc. In implementations, a way of attaching the message type information to instant communication message may include the message type information being a part of the content of the instant communication message, the message type information being attribute information of the instant communication message, or the message type information being an attachment of the instant communication message.

Apparently, the type of the instant communication message and the manner of determining the type of the instant communication message are both not limited to the foregoing description. One skilled in the art may also make other modifications, inspired by the technical essence of the present disclosure, which should be covered by the scope of protection of the present disclosure, if functions and effects thereof that are achieved are the same as or similar to those of the present disclosure.

In implementations, the prompting module 718 may invoke a corresponding way of prompting according to the message type, where at least a first way of prompting and a second way of prompting are set up in advance, and the first way of prompting and the second way of prompting are different from each other.

In implementations, a way of prompting may include change(s) in content, color and/or position, etc., of an image, or change(s) in content, color and/or position, etc., of a text, or an addition of text to an image, or a prompting sound, or a vibration reminder of a communication device, etc.

In implementations, different ways of prompting may be set up for corresponding message types. As such, upon receiving a prompt of an instant communication message, a user may know a type of the received instant communication message. In implementations, each message type may correspond to one way of prompting, or multiple message types correspond to one way of prompting. By way of example, a text message, a voice message, and a video message may correspond to individual ways of prompting respectively. For example, a corresponding prompting sound of each manner may be different from each other. Alternatively, a corresponding prompting image or prompting text of each manner may be different from each other. Additionally, a normal message may correspond to a way of prompting whereas a special message corresponds to another way of prompting. At this time, a text message, a voice message and a video message belonging to a normal message may adopt the same way of prompting. A text message, a voice message and a video message belonging to a special message may adopt the same way of prompting. Apparently, the text message, the voice message and the video message belonging to the normal message may also correspond to different ways of prompting, and the text message, the voice message and the video message belonging to the special message may also correspond to different ways of prompting.

By the above example methods and client terminals of prompting an instant communication message, different ways of prompting are defined for different message types in advance, such that a user is able to distinguish respective message types of currently received instant communication messages for different ways of prompting. Thus, a user can distinguish reading occasions according to his/her degree of concern for messages of different types. For example, a user may choose to read an instant communication message that is received in a more private environment upon determining that the received message is a special message according to a prompt, thereby avoiding a leakage of private information.

Multiple embodiments of the present disclosure are introduced in the specification. One skilled in the art can understand that the embodiments of the present disclosure can be combined with each other. Moreover, one skilled in the art should understand that the present disclosure has many variations and changes without departing from the spirit of the present disclosure, and it is intended that the appended claims cover these variations and changes without departing from the spirit of the present disclosure.

What is claimed is:

1. A method implemented by a computing device, the method comprising:
    receiving a new instant message at the computing device; and
    enhancing privacy of the new instant message by:
        determining a message type based at least in part on the new instant message, the determined message type including at least one of a normal message type or a special message type;
        invoking a corresponding way of prompting based at least in part on the determined message type, the corresponding way of prompting comprising a first way of prompting or a second way of prompting, the second way of prompting being different from the first way of prompting, the first way of prompting comprising setting a first prompting indicator at a first predetermined position of an interface image, and the second way of prompting comprising setting a second prompting indicator at a second predetermined position of the interface image, wherein the second prompting indicator is different from the first prompting indicator, the second predetermined position covering at least a part of the first predetermined position;
        rendering the first prompting indicator at the interface image to have a first style in response to determining that the new instant message corresponds to the normal message type; and
        rendering the second prompting indicator at the interface image to have a second style in response to determining that the new instant message corresponds to the special message type.

2. The method of claim 1, wherein a normal message of the normal message type being displayed repeatedly, and content of a special message of the special message type being deleted after the special message is displayed for a predetermined number of times or after a predetermined time interval since the special message is displayed for the first time.

3. The method of claim 1, wherein the interface image is provided with a session list icon, and wherein the first way of prompting and the second way of prompting add the first prompting indicator and the second prompting indicator on top of the session list icon.

4. The method of claim 1, wherein the new instant message comprises a special message, and the method further comprises:
    receiving a request for viewing the special message;
    receiving an input password; and
    displaying content of the special message in response to the input password being matched with a preset access password.

5. The method of claim 4, wherein the computing device comprises a mobile device, and wherein receiving the request for viewing the special message comprises detecting successive changes of a motion direction of the mobile device in opposite direction.

6. The method of claim 4, wherein receiving the request for viewing the special message comprises a session list icon being in a clicked state for a predetermined time duration.

7. The method of claim 1, wherein the second way of prompting further comprises displaying a session list in an interface without displaying the new instant message.

8. The method of claim 1, further comprising:
    receiving an instruction of not displaying the new instant message;
    providing a password setting interface; and receiving an input password for storing the input password as a preset access password.

9. One or more computer-readable media storing executable instructions that, when executed by one or more processors, cause the one or more processors to perform acts comprising:
    receiving an instant message; and
    enhancing privacy of the instant message by:
        determining a message type based at least in part on the instant message, the determined message type including at least one of a normal message type or a special message type: and
        invoking a corresponding way of prompting based at least in part on the determined message type, the corresponding way of prompting comprising a first way of prompting or a second way of prompting, the second way of prompting being different from the first way of prompting, the first way of prompting comprising setting a first prompting indicator at a first predetermined position of an interface image, and the second way of prompting comprising setting a second prompting indicator at a second predetermined position of the interface image, wherein the second prompting indicator is different from the first prompting indicator, the second predetermined position covering at least a part of the first predetermined position;
        rendering the first prompting indicator at the interface image to have a first style in response to determining that the instant message corresponds to the normal message type; and
        rendering the second prompting indicator at the interface image to have a second style in response to determining that the instant message corresponds to the special message type.

10. The one or more computer-readable media of claim 9, wherein a normal message of the normal message type being displayed repeatedly, and content of a special message of the special message type being deleted after the special message is displayed for a predetermined number of times or after a predetermined time interval since the special message is displayed for the first time.

11. The one or more computer-readable media of claim 9, wherein the interface image is provided with a session list icon, and wherein the first way of prompting and the second way of prompting add the first prompting indicator and the second prompting indicator on top of the session list icon.

12. The one or more computer-readable media of claim 9, wherein the instant message comprises a special message, and the acts further comprise:
   receiving a request for viewing the special message;
   receiving an input password; and
   displaying content of the special message in response to the input password being matched with a preset access password.

13. The one or more computer-readable media of claim 12, wherein receiving the request for viewing the special message comprises detecting successive changes of a motion direction of a mobile device in opposite direction.

14. The one or more computer-readable media of claim 12, wherein receiving the request for viewing the special message comprises a session list icon being in a clicked state for a predetermined time duration.

15. The one or more computer-readable media of claim 9, wherein the second way of prompting comprises displaying a session list in an interface without displaying the instant message.

16. The one or more computer-readable media of claim 9, the acts further comprising:
   receiving an instruction of not displaying the instant message;
   providing a password setting interface; and
   receiving an input password for storing the input password as a preset access password.

17. A client terminal comprising:
   one or more processors;
   one or more memories stored thereon computer-executable instructions, executable by the one or more processors, to cause the one or more processors to perform acts comprising:
   receiving an instant communication message;
   enhancing privacy of the instant communication message by:
      determining a message type according to the instant communication message, the determined message type including at least one of a normal message type or a special message type;
      invoking a corresponding way of prompting according to the determined message type; wherein at least a first way of prompting and a second way of prompting are preset, and the first way of prompting and the second way of prompting are different from each other, the first way of prompting comprising setting a first prompting indicator at a first predetermined position of an interface image, and the second way of prompting comprising setting a second prompting indicator at a second predetermined position of the interface image, wherein the second prompting indicator is different from the first prompting indicator, the second predetermined position covering at least a part of the first predetermined position;
      rendering a first prompting indicator at the interface image to have a first style in response to determining that the instant communication message corresponds to the normal message type; and
      rendering the second prompting indicator at the interface image to have a second style in response to determining that the instant communication message corresponds to the special message type.

18. The client terminal of claim 17, wherein a normal message of the normal message type being displayed repeatedly, and content of a special message of the special message type being deleted after the special message is displayed for a predetermined number of times or after a predetermined time interval since the special message is displayed for the first time.

19. The client terminal of claim 17, wherein the instant communication message comprises a special message, and the acts further comprise:
   receiving a request for viewing the special message;
   receiving an input password; and
   displaying content of the special message in response to the input password being matched with a preset access password.

20. The client terminal of claim 17, wherein the interface image is provided with a session list icon, and wherein the first way of prompting and the second way of prompting add the first prompting indicator and the second prompting indicator on top of the session list icon.

* * * * *